United States Patent
Orr

(10) Patent No.: US 7,952,892 B2
(45) Date of Patent: May 31, 2011

(54) DC CONVERTERS WITH CONSTANT AND VARIABLE DUTY RATIO SWITCHING

(75) Inventor: Raymond K. Orr, Kanata (CA)

(73) Assignee: Power Integrations, Inc., San Jose, CA (US)

( * ) Notice: Subject to any disclaimer, the term of this patent is extended or adjusted under 35 U.S.C. 154(b) by 505 days.

(21) Appl. No.: 11/696,457

(22) Filed: Apr. 4, 2007

(65) Prior Publication Data
US 2007/0242487 A1 Oct. 18, 2007

Related U.S. Application Data

(60) Provisional application No. 60/788,719, filed on Apr. 4, 2006.

(51) Int. Cl.
*H02M 3/335* (2006.01)
(52) U.S. Cl. ............... 363/16; 363/124; 323/267
(58) Field of Classification Search ............ 363/17, 363/98, 21.02, 21.03, 124, 16; 323/267
See application file for complete search history.

(56) References Cited

U.S. PATENT DOCUMENTS

| | | | | | |
|---|---|---|---|---|---|
| 4,975,821 | A | * | 12/1990 | Lethellier | 363/21.02 |
| 5,838,558 | A | * | 11/1998 | Tan et al. | 363/91 |
| 6,181,585 | B1 | * | 1/2001 | Cardwell et al. | 363/71 |
| 6,344,979 | B1 | * | 2/2002 | Huang et al. | 363/16 |

OTHER PUBLICATIONS

Bo Yang, "Topology Investigation for Front End DC/DC Power Conversion for Distributed Power System"; Sep. 12, 2003, Blacksburg, VA, U.S.A.

\* cited by examiner

*Primary Examiner* — Harry Behm
*Assistant Examiner* — Matthew Grubb
(74) *Attorney, Agent, or Firm* — Blakely Sokoloff Taylor & Zafman, LLP

(57) ABSTRACT

A DC converter comprises a half bridge supply circuit and one or more flyback or forward converter output circuits, and optionally also an LLC converter whose control can determine a common variable switching frequency. The half bridge supply circuit produces a 50% duty output alternating between two input voltages, such as zero and a voltage Vin. In each flyback or forward converter output circuit, a switch connects a transformer primary to the half bridge supply circuit output in a PWM controlled manner to regulate a respective flyback or forward converter DC output which is produced by the converter output circuit, with a duty ratio less than 50% whereby switching losses are reduced. Soft switching is further facilitated by the half bridge supply circuit having two transistors controlled in a complementary manner.

15 Claims, 4 Drawing Sheets

DC CONVERTERS WITH CONSTANT AND VARIABLE DUTY RATIO SWITCHING

This application claims the benefit of U.S. Provisional Application No. 60/788,719 filed Apr. 4, 2006, the entire contents and disclosure of which are hereby incorporated herein by reference.

This invention relates to DC converters, which are also referred to by other names such as DC-DC converters; DC or DC-to-DC regulators; switch mode regulators, converters, power converters, or power supplies; and so on. The term "DC converter" or simply "converter" is used herein to include all such terms.

BACKGROUND

DC converters can have various configurations or forms, including so-called flyback and forward converters. In order to reduce voltage stresses on MOSFET switches in such DC converters, it is known to provide a forward converter or a flyback converter with a half-bridge or two-transistor primary switching arrangement. Flyback and forward converters can have similar such primary switching arrangements, so that they may differ from one another only on the secondary or output sides of transformers of the converters.

While such DC converters can be advantageous for the reduced voltage stresses that they provide for the MOSFET switches, they do not facilitate providing so-called soft or resonant switching of the switches. Consequently, switching losses remain a disadvantage of such DC converters.

It is desirable to provide improved DC converters which not only provide relatively low voltage stresses for the switches but also facilitate soft switching for reduced switching losses.

SUMMARY OF THE INVENTION

According to one aspect of this invention there is provided a DC converter comprising: a first switch coupled in series with a first diode between two input terminals for supply of an input voltage; a second switch coupled in series with a second diode between the two input terminals; a transformer having a primary winding coupled between a first junction of the first switch with the first diode and a second junction of the second switch with the second diode, the arrangement being such that the primary winding is coupled in series with the first and second switches between the two input terminals; a flyback or forward DC converter output circuit connected to a secondary winding of the transformer for producing a DC output; a control signal supplied to the first switch for switching the first transistor on and off with a substantially constant duty ratio in successive switching cycles; and a control unit responsive to the DC output for controlling the second switch with a variable duty ratio to regulate the DC output, the second switch being switched off in each switching cycle while the first switch is on.

Preferably the constant duty ratio is substantially 50% and the variable duty ratio is up to 50%. The term "substantially" as used herein in this context is intended to allow for dead times and switching times to avoid simultaneous conduction of switches connected in series across a supply voltage and to accommodate resonances for switching edges or transitions to facilitate soft switching and reduced switching losses.

The first switch, first diode, input terminals, and control signal can be provided in common for a plurality of instances of the second switch, second diode, transformer, flyback or forward DC converter output circuit, and control unit, each of said instances providing a respective independently regulated DC output.

The DC converter can also include an LLC converter output circuit coupled to the first junction for providing an LLC output, and an LLC control circuit responsive to the LLC output for controlling a variable frequency oscillator for determining a switching cycle frequency of the control signal to regulate the LLC output.

Preferably a third switch is connected in parallel with the first diode, the third switch being controlled in a complementary manner to the first switch. In this case the converter can also include an inductor and a capacitor coupled in series between the first junction and one of the input terminals, to facilitate soft switching of the first and third switches.

Another aspect of the invention provides a DC converter comprising a half bridge supply circuit and a flyback or forward converter output circuit, wherein the half bridge supply circuit comprises:

a switch coupled between a first input terminal and an output point of the half bridge supply circuit, and another switch coupled between a second input terminal and said output point, the switches being controlled in a complementary manner with substantially 50% duty ratio to switch said output point alternately between input voltages supplied to the first and second input terminals;

and wherein the flyback or forward converter output circuit comprises:

a primary winding of a transformer coupled via a switch between the output point of the half bridge supply circuit and one of the input terminals, a secondary winding of the transformer and at least a rectifier and output capacitor providing a flyback or forward converter DC output, and a PWM control arrangement responsive to the DC output for controlling switching of the switch of the converter output circuit with a duty ratio less than 50% thereby to regulate the DC output, the PWM control arrangement being arranged to turn on the switch of the converter output circuit with turn on of one of the switches of the half bridge supply circuit for current flow through the primary winding, and to turn off the switch of the converter output circuit before turn off of said one of the switches of the half bridge supply circuit.

The converter can include a capacitor connected in parallel with and augmenting parasitic capacitance of the switch of the converter output circuit.

Preferably the flyback or forward converter output circuit includes a diode or a further switch coupled between a junction of the primary winding with the switch of the converter output circuit and another of the input terminals for limiting voltage stress on the switch of the converter output circuit.

Advantageously the DC converter can include a plurality of said flyback or forward converter output circuits each coupled to a single half bridge supply circuit.

The converter can include a resonant mode converter coupled to the output point of the half bridge supply circuit for providing a resonant mode converter output, and a resonant mode converter control circuit responsive to the resonant mode converter output for controlling a switching frequency of the switches of the half bridge supply circuit to regulate the resonant mode converter output. Preferably the resonant mode converter comprises an LLC converter.

The DC converter can also include an inductor and a capacitor coupled in series between the output point of the half bridge supply circuit and one of the input terminals.

An aspect of the invention provides a DC converter comprising two switches and two diodes, each switch being connected in series with a respective one of the diodes to form a half-bridge for receiving an input voltage and for providing an output from a diagonal of the half-bridge, one of the switches being controlled with a variable duty ratio for controlling the output and the other being controlled with a constant duty ratio.

Another aspect of the invention provides a DC converter having input voltage terminals connected to a first switch and a diode connected in series and to second and third switches connected in series, providing an output from between a first junction between the first switch and the diode and a second junction between the second and third switches, and a control unit for controlling the first switch to control said output, the second and third switches being controlled so that they are not simultaneously conductive and so that the second switch is turned off after the first switch in each switching cycle of the converter.

BRIEF DESCRIPTION OF THE DRAWINGS

The invention will be further understood from the following description by way of example with reference to the accompanying drawings, in which the same references are used in different figures to denote similar elements and in which.

DETAILED DESCRIPTION

Figure 1:
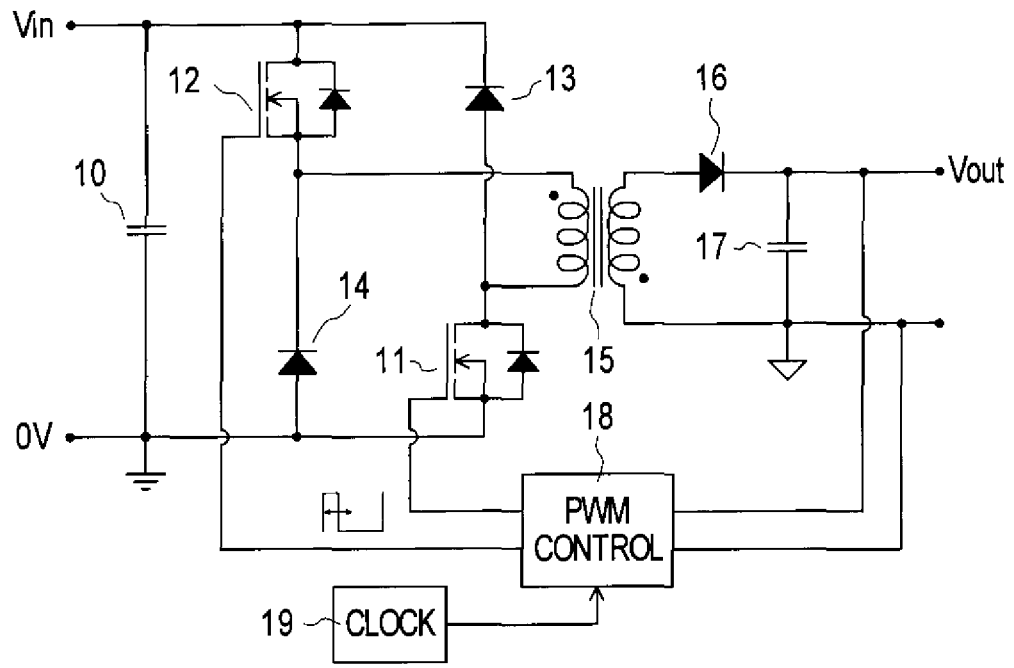
FIG. 1 schematically illustrates a known flyback converter.

FIG. 1 schematically illustrates a known form of flyback converter having a half-bridge or two-transistor primary switching arrangement. A forward converter can have a similar primary switching arrangement, differing in its configuration on the secondary side of the transformer, as is well known.

In the flyback converter of FIG. 1, an input voltage source Vin, relative to a zero voltage 0V or ground reference, smoothed by an input capacitor 10, is switched by a half-bridge primary switching arrangement of two MOSFETs 11, 12 and two diodes 13, 14 to a primary winding of a flyback transformer 15, a secondary winding of which is coupled via a diode 16 to an output capacitor 17 to produce an output voltage Vout. Dots adjacent the transformer windings indicate the winding senses or polarities in conventional manner. A PWM (pulse width modulation) control unit 18, supplied with a clock signal at a desired switching frequency of the converter from a clock source 19, is supplied with the output voltage Vout of the converter and supplies PWM control signals to gates of the MOSFETs 11 and 12 to regulate the output voltage Vout. The arrangement can also include in known manner a current sensing resistor for example connected in series with the source-drain path of the MQSFET 11, which for simplicity is not shown.

In the flyback converter of FIG. 1, the MOSFETs 11 and 12 are switched simultaneously on and off at the clock or switching frequency, with a duty factor or ratio D that, in conjunction with the turns ratio of the transformer 15, determines a ratio of the input voltage Vin to the output voltage Vout. The duty ratio D can be a maximum of 50%, for resetting of the transformer 15. FIG. 1 diagrammatically shows the PWM control signals supplied to both MOSFETs 11 and 12.

When the MOSFETs 11 and 12 are on, they conduct current from the input voltage and input capacitor 10 to the primary winding of the transformer 15. When the MOSFETs 11 and 12 are simultaneously turned off at the end of the duty period in each switching cycle of the converter, the voltage across the primary winding increases until it is limited by conduction of the diodes 13 and 14. Consequently, this primary switching arrangement has the advantage of limiting voltage stresses on the MOSFETs 11 and 12 to the input voltage Vin plus the forward voltage drops of the two diodes 13 and 14.

The flyback converter of FIG. 1 has switching losses which are undesirable. For example, when the MOSFET 11 is turned off, a parasitic capacitance of this MOSFET 11, which is effectively a capacitor in parallel with the drain-source path of this MOSFET, is charged to the input voltage Vin plus the forward voltage drop of the diode 13. When the MOSFET 11 is turned on, this parasitic capacitance is discharged to substantially zero volts. Consequently, in each switching cycle of the converter the energy required for charging this parasitic capacitance, from substantially zero volts to more than the input voltage vin, is dissipated in the MOSFET 11. Similar losses occur for the MOSFET 12.

Figure 2:
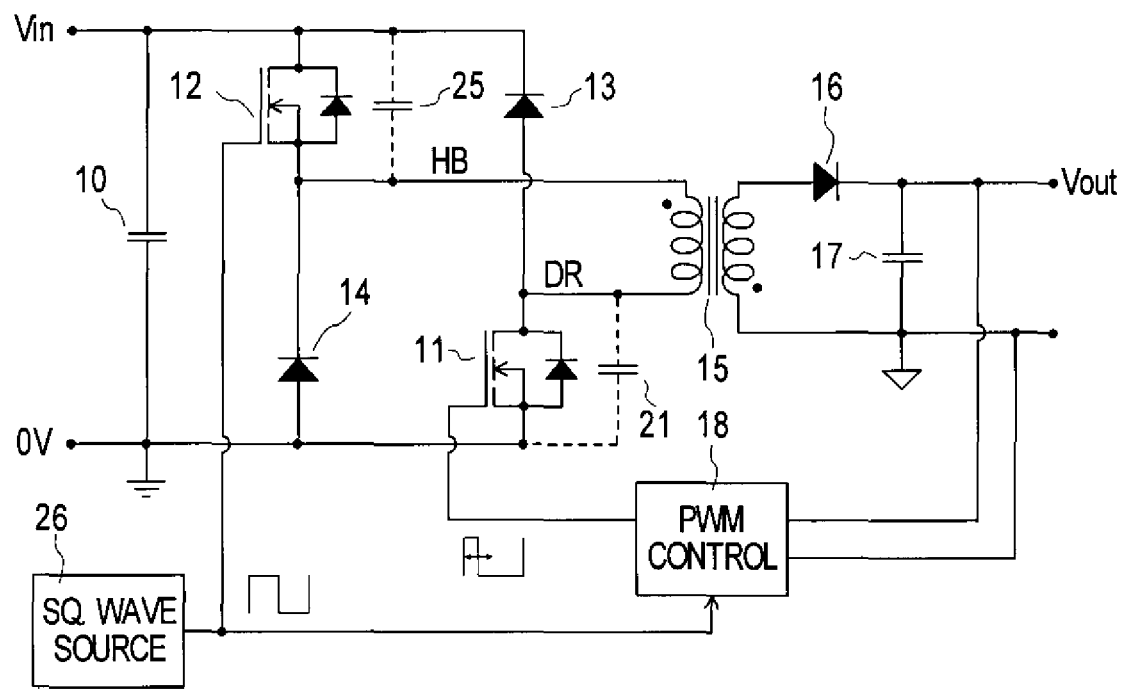
FIG. 2 schematically illustrates a flyback converter in accordance with an embodiment of this invention.

FIG. 2 schematically illustrates a flyback converter in accordance with an embodiment of this invention, the same references as in FIG. 1 being used to denote corresponding components. In addition, FIG. 2 illustrates with dashed-line connections parasitic capacitances 21 and 25 of the MOSFET switches 11 and 12 respectively. Each of these parasitic capacitances is in parallel with the drain-source path of the respective MOSFET 11 or 12, and can be increased by an additional physical capacitor if desired. For reference purposes, FIG. 2 also identifies a point HB connecting the source of the MOSFET 12 to one end of the primary winding of the transformer 15, and a point DR connecting the drain of the MOSFET 11 to the other end of the primary winding of the transformer 15.

The flyback converter of FIG. 2 differs from that of FIG. 1 in the manner in which the MOSFET 12 is driven. In the flyback converter of FIG. 1, the MOSFET 12 is driven as described above with a PWM signal from the control unit 18 in synchronism with the MOSFET 11. In contrast, in the flyback converter of FIG. 2 the MOSFET 12 is not driven with a PWM signal, but with a substantially square waveform (i.e. substantially 50% duty) at the converter switching frequency. As shown in FIG. 2, this square waveform is produced by a square waveform source 26, which can for example be constituted by a clock source and a MOSFET gate drive circuit, which also supplies a clock signal at the converter switching frequency to the PWM control unit 18, replacing the clock 19 in the flyback converter of FIG. 1.

Figure 3:
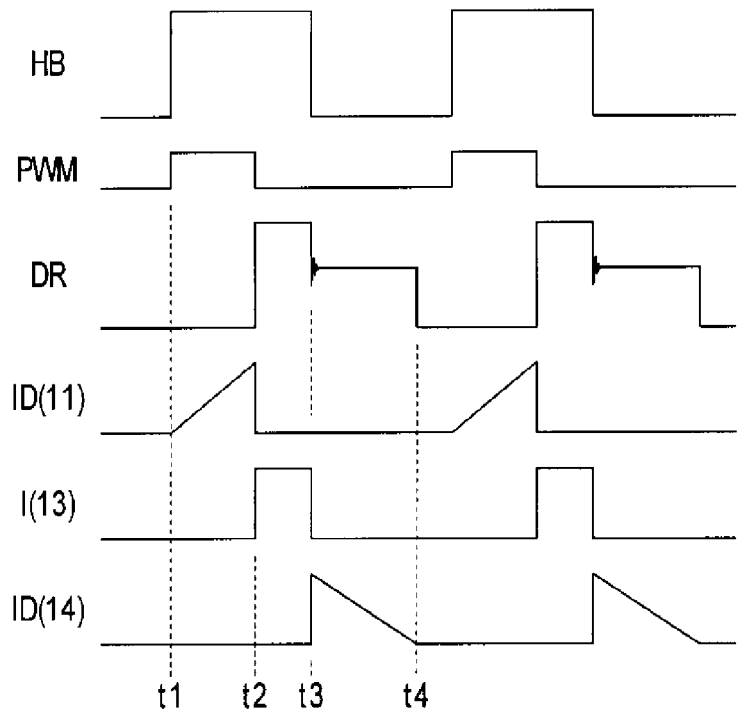
FIG. 3 is a timing diagram illustrating, in a simplified manner and not to scale, waveforms which can occur in operation of the flyback converter of FIG. 2.
Figure 4:
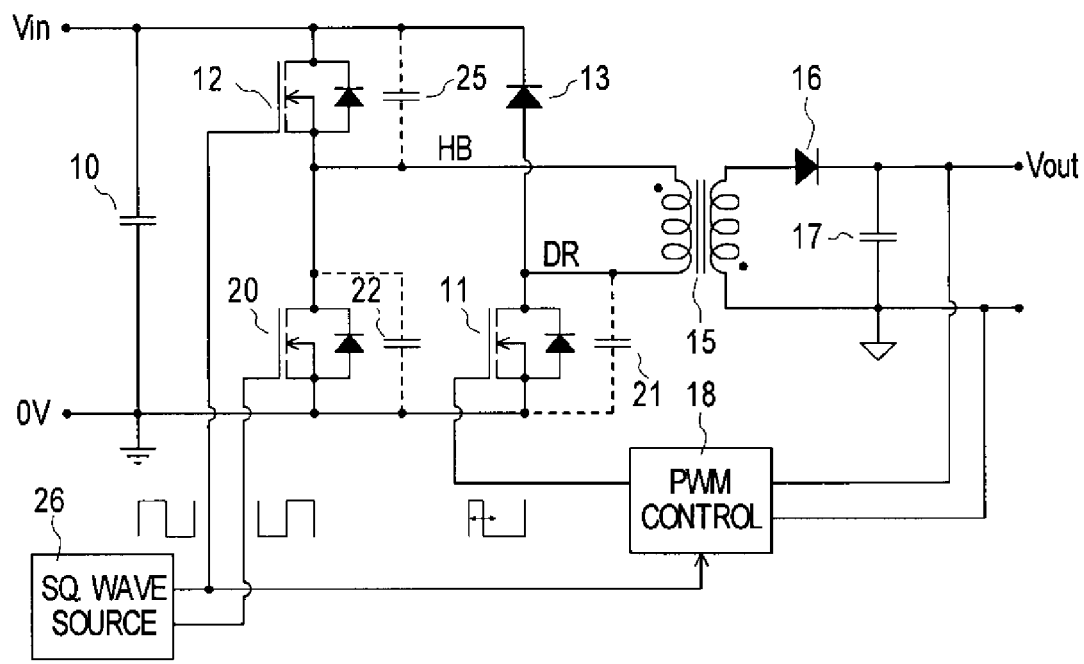
FIG. 4 schematically illustrates a flyback converter in accordance with another embodiment of this invention.
Figure 5:
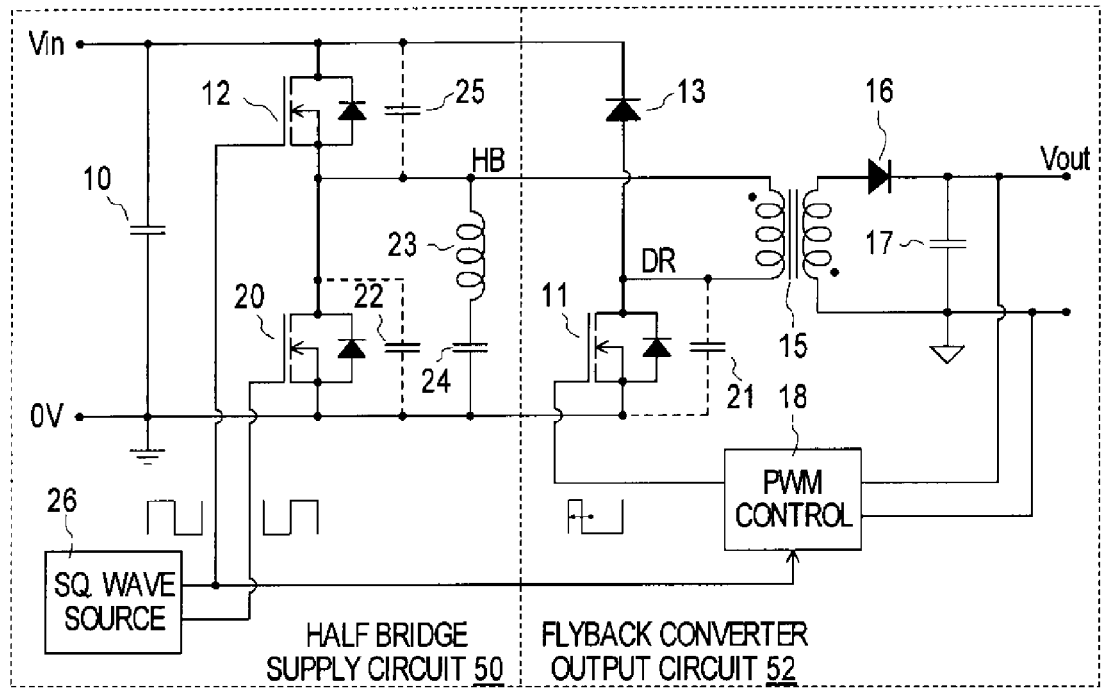
FIG. 5 schematically illustrates a flyback converter in accordance with a further embodiment of this invention.

FIG. 3 shows, in a simplified manner and not to scale, relative timing of signals which can occur in operation of the flyback converter of FIG. 2 (or of FIG. 4 or FIG. 5 described below), more particularly representing voltages at the points HB and DR denoted by the same references, a PWM control signal (denoted PWM in FIG. 3) supplied by the control unit 18 to the gate of the MOSFET 11, and currents ID(11), I(13), and ID(14) in respectively the drain-source path of the MOS- FET 11, the diode 13, and the diode 14 (or the drain-source path of a MOSFET 20 replacing this diode as described below with reference to FIGS. 4 and 5).

As shown in FIG. 3, and also diagrammatically by switching waveforms in FIG. 2, in each converter switching cycle the MOSFET 11 is turned on at substantially the same time as the MOSFET 12, at a time t1 in FIG. 3, but it is turned off by the PWM signal from the control unit 18 while the MOSFET 12 remains turned on, at a time t2 in FIG. 3. The voltage at the point HB is substantially a square wave, equal to the source voltage Vin from the time t1 to a time t3 in each switching cycle and otherwise zero volts, so that the MOSFET 11 is turned off at a time when the point HB is at the voltage Vin.

On turn-on of the MOSFETs 11 and 12 at the time t1, the drain current ID(11) of the MOSFET 11 rises linearly, as shown in FIG. 3, due to the source voltage Vin being applied to the inductance of the transformer 15. At the time t2, the MOSFET 11 is turned off and the voltage DR at its drain rises rapidly until it is clamped at substantially the source voltage Vin by conduction of the diode 13. Consequently, voltage stress on the MOSFET 11 is limited to approximately the source voltage Vin. As shown in FIG. 3 by the current I(13), from the time t2 until the time t3 current in the inductance of the transformer 15 is maintained via the diode 13 and the turned-on MOSFET 12, with only a small voltage difference between the points HB and DR.

When the MOSFET 12 is turned off at the time t3, the voltage at the point DR collapses, with ringing as shown in FIG. 3 due to resonance between the capacitances 21 and 25 and the leakage inductance of the transformer 15, to a voltage corresponding to the output voltage Vout multiplied by the turns ratio of the transformer 15. Magnetizing current of the transformer is conducted via the output diode 16, and from the time t3 transformer primary current is conducted via the forward-biased diode 14 and ramps down to zero at a time t4, prior to the start of the next switching cycle.

At the time t2, when the MOSFET 11 is turned off while the MOSFET 12 remains turned-on, the rise in the voltage DR is slowed by charging of the parasitic capacitance 21, including any additional capacitance in parallel. With a sufficient capacitance 21, the current ID(11) falls to substantially zero before the voltage DR has risen appreciably, thereby achieving a substantially zero voltage turn-off of the MOSFET 11, and consequently a reduction in switching losses of the converter. However, there are still switching losses associated with turn-on of the MOSFETs 11 and 12.

FIG. 4 schematically illustrates a flyback converter in accordance with another embodiment of this invention, this being similar to that of FIG. 2 with the diode 14 replaced by another MOSFET 20, with its body diode having the same polarity as the diode 14 in FIG. 2. As shown in FIG. 4, the gate of the MOSFET 20 is driven from the square wave source 26 in a complementary manner to the MOSFET 12. FIG. 4 also shows with a dashed line connection a parasitic capacitance 22 of the MOSFET 20, which can be augmented by a physical capacitance connected in parallel if desired.

The operation of the converter of FIG. 4 is similar to that described above, but provides substantial advantages by virtue of soft or resonant switching of the MOSFETs, and hence substantially reduced switching losses. More particularly:

The MOSFET 11 is turned off at the time t2 under substantially zero voltage conditions in the same manner as described above. At the time t3, the MOSFET 12 is first turned off, the voltage at the point DR falling as described above until the output diode 16 conducts, and leakage inductance forcing current to flow through the body diode of the MOSFET 20. With its body diode conducting, the MOSFET 20 is turned on under substantially zero voltage conditions. Thus the MOSFET 20 is turned on slightly after turn-off of the MOSFET 12, this also avoiding any simultaneous conduction of the MOSFETs 12 and 20 which would short the source voltage Vin. Leakage current ramps to zero and the diode 13 comes out of conduction, and the turned-on MOSFET 20 holds the point HB at zero volts.

At the time t1, the MOSFET 11 is turned on just before the MOSFET 20 is turned off (with the MOSFET 12 being turned on after a further short delay or dead time to avoid simultaneous conduction of the MOSFETs 12 and 20), leakage charging the point HB to the source voltage Vin. Because the capacitances 21, 22, and 25 are always charged and discharged resonantly, switching losses are substantially reduced.

In a typical form of the flyback converter of FIG. 4, the capacitances 22 and 25 can be constituted by only the parasitic capacitances of the MOSFETs 20 and 12 respectively, whereas the capacitance 21 can comprise the parasitic capacitance of the MOSFET 11 and an additional physical capacitance connected in parallel.

The flyback converter of FIG. 4 as described above relies on leakage current to provide enough energy to resonate the capacitances 22 and 25 up to the source voltage Vin to achieve soft switching. However, the load dependence of a flyback converter can be such that, for light loading, there may not be sufficient energy for this resonance to ensure soft switching of the MOSFETs 12 and 20. This difficulty is avoided by the flyback converter of FIG. 5, which is the same as the flyback converter of FIG. 4 with an additional inductor 23, in series with a capacitor 24, coupled between the point HB and the zero volt line. The series inductor 23 and capacitor 24 can instead be connected between the point HB and any other DC reference point, for example the source voltage Vin. The capacitor 24 serves for DC blocking and its capacitance is not required to operate in any resonant manner.

Because the voltage at the point HB is a square waveform, as shown in FIG. 3, which is applied across the inductor 23, the inductor 23 has a triangular current waveform. On turn-off of the MOSFET 20 and turn-on of the MOSFET 12, this inductor current charges the capacitance 22 and discharges the capacitance 25; conversely on turn-off of the MOSFET 12 and turn-on of the MOSFET 20 the inductor current discharges the capacitance 22 and charges the capacitance 25. Consequently the inductor 23 resonates with the capacitances 22 and 25 during the switch transitions to ensure soft switching of the MOSFETs 12 and 20, regardless of the load of the flyback converter.

FIG. 5 illustrates the flyback converter shown therein within two dashed-line boxes, identified as a half bridge supply circuit 50 and a flyback converter output circuit 52. A similar division can be applied to each of the flyback converters of FIGS. 2 and 4. Although flyback converters are illustrated in FIGS. 2, 4, and 5 as described above, in each case the flyback converter output circuit 52 can be optionally replaced by a forward converter output circuit, for example a forward converter output circuit 54 as shown in FIG. 6, to provide a forward converter instead of a flyback converter.

Figure 6:
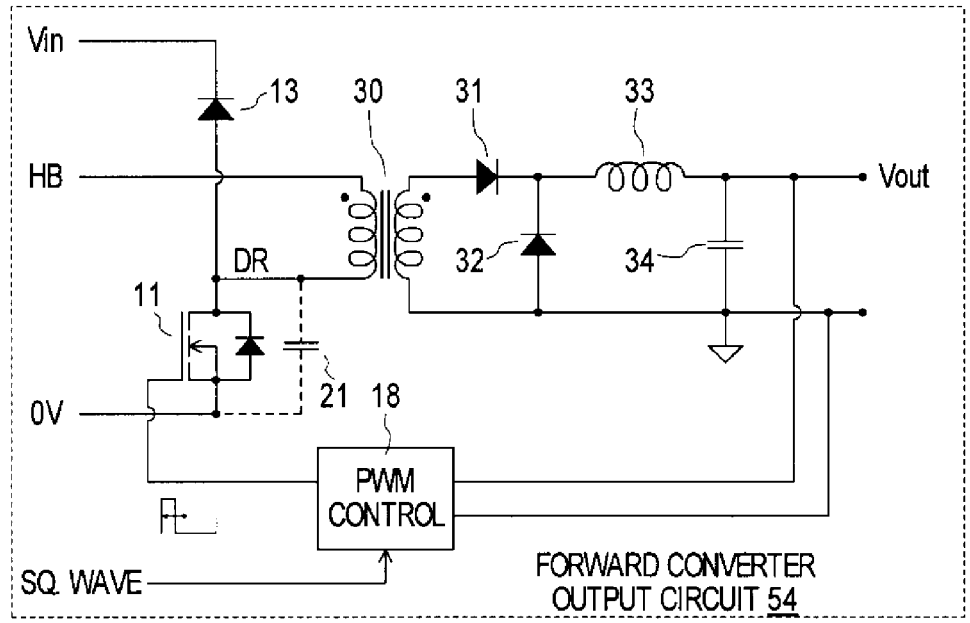
FIG. 6 illustrates a different secondary circuit arrangement for providing a forward converter instead of a flyback converter.

FIG. 6 shows the MOSFET 11 and its capacitance 21, the diode 13, and the PWM control unit 18 and their connections which are the same as in the flyback converter output circuits of FIGS. 2, 4, and 5. The components 15, 16, and 17 of each flyback converter output circuit are replaced, in the forward converter output circuit 54 of FIG. 6, by a transformer 30 having a differently-sensed secondary winding compared with the transformer 15, a rectifier diode 31, a 'freewheel' diode 32, a series inductor 33, and an output capacitor 34. The arrangement of these components and their operation in a conventional forward converter are well known and no further description in this respect is necessary.

Thus it will be appreciated that in each instance of the converters described herein a flyback converter output circuit 52 can be replaced by a forward converter output circuit 54, and a forward converter output circuit 54 can be replaced by a flyback converter output circuit 52, to suit particular requirements without any change being required in the rest of the converter, i.e. in the half bridge supply circuit 50 which can have any of the forms shown in FIGS. 2, 4, and 5.

Furthermore, a single half bridge supply circuit 50 as described above with reference to FIGS. 2 to 5 can be used to provide the voltage HB and the square wave from the source 26 to an arbitrary number of one or more converter output circuits, each of which can be either a flyback converter output circuit 52 or a forward converter output circuit 54, and such output circuits can be used in any desired mix of flyback and/or forward converter output circuits. Each of the output circuits has its own PWM control unit 18 and feedback for output voltage regulation as described above and as shown for the output circuits 52 and 54 in FIGS. 5 and 6, so that each output voltage produced by a respective converter output circuit 52 or 54 can be individually regulated substantially independently of any other output voltage. Each control loop can also include, for example, individual current sensing as indicated above.

In addition, individual converter output circuits can provide a plurality of different outputs, for example from additional secondary windings of the same transformer 15 or 30, which are all commonly regulated by the PWM control unit 18 for the respective converter output circuit.

Figure 7:
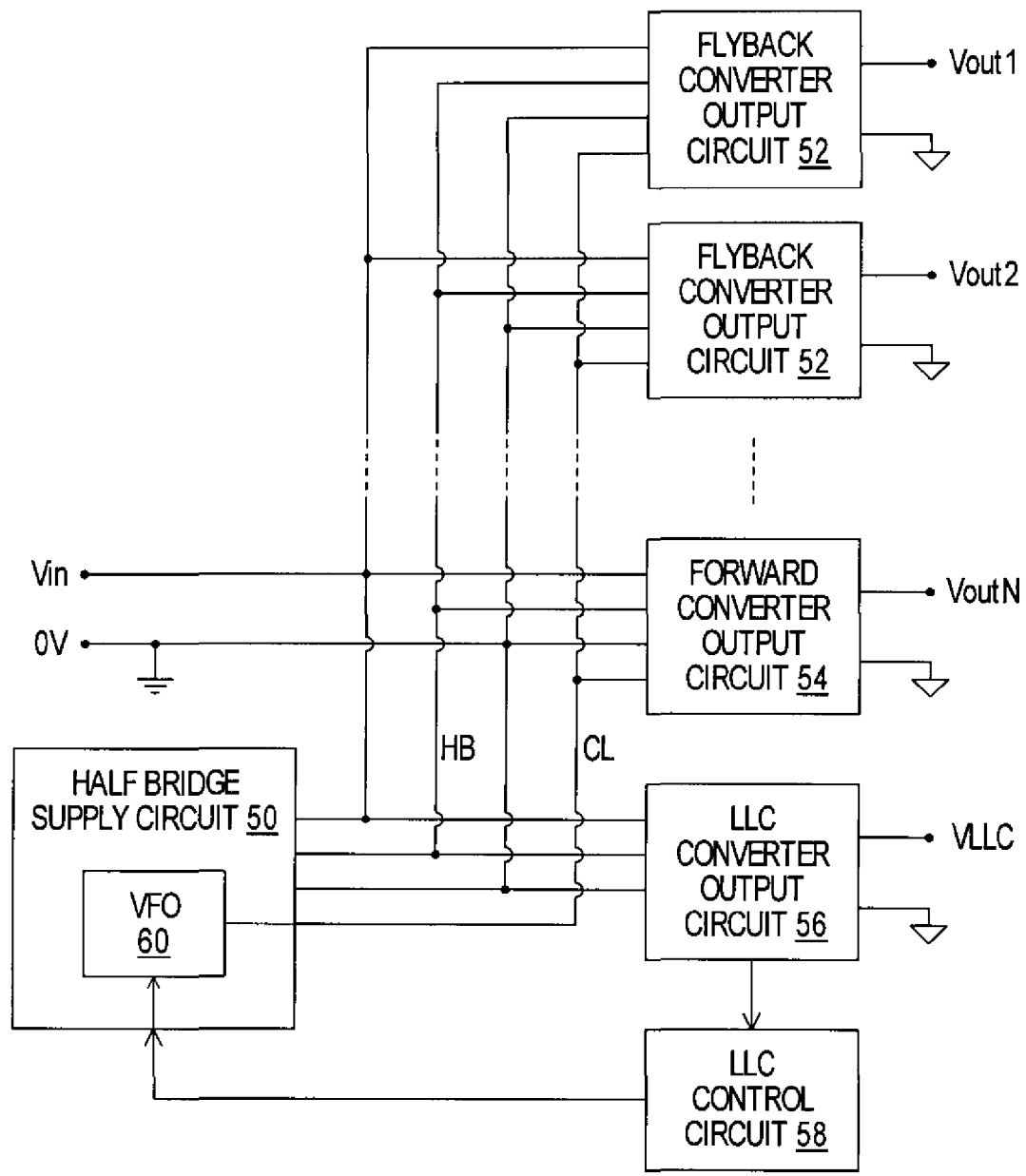
FIG. 7 illustrates a DC converter providing a plurality of individually regulated output voltages, in accordance with another embodiment of this invention.

By way of example, FIG. 7 illustrates in a block diagram a DC converter arrangement having a single half bridge supply circuit 50 from which the signal HB is supplied to a plurality of N converter output circuits 52 and 54 providing N independently regulated output voltages Vout1, Vout2, . . . VoutN each relative to its respective ground. FIG. 7 shows two flyback converter output circuits 52 providing the output voltages Vout1 and Vout2, and one forward converter output circuit 54 providing the output voltage VoutN, with possible other converter output circuits and their connections being represented by dashed lines. However, it will be appreciated that there can be any number, type, and mix of converter output circuits 52 and/or 54. FIG. 7 also shows connections of the source voltage Vin, zero volt line 0V, and a clock signal CL, as well as the signal HB, to the circuits 50, 52, and 54. The clock signal CL corresponds to the output from the square wave source 26 to the PWM control unit 18 in each of the converter circuits of FIGS. 2, 4, and 5 as described above.

The converter arrangement of FIG. 7 also includes an LLC converter output circuit 56 which provides a further output VLLC in response to the signal HB, with regulation provided by an LLC control circuit 58 in a feedback path for controlling the frequency of a variable frequency oscillator, or VFO, 60 in the half bridge supply circuit 50. The output of the VFO 60 is a substantially square waveform constituting the signal CL and determining the frequency of the signals CL and HB. Thus in the converter arrangement of FIG. 7 the signals CL and HB have a variable frequency, and this frequency is controlled for regulation of the frequency-dependent LLC converter output in known manner.

Consequently, all of the DC converters of the arrangement of FIG. 7 operate at the same switching frequency, thereby reducing potential unpredictable interactions among different converters. A converter arrangement such as that of FIG. 7 may be of particular advantage for example in consumer electronics equipment using plasma displays, for which many different regulated voltages may be required.

Instead of an LLC converter as shown in FIG. 7, any other desired form of resonant mode converter can be provided in a similar manner. Resonant mode converters, including series resonant, parallel resonant, series parallel resonant or LCC, and LLC converters, and operation using a half bridge converter topology are known in the art and need not be described here. See for example Chapter 4, entitled "LLC Resonant Converter", of "Topology Investigation for Front End DC/DC Power Conversion for Distributed Power System", by Bo Yang in a dissertation submitted to the Faculty of the Virginia Polytechnic Institute and State University, Sep. 12, 2003, the entire disclosure of which is hereby incorporated herein by reference.

From the above description, it can be appreciated that embodiments of the invention provide a flyback or forward DC converter with a primary switching arrangement with reduced switching losses due to one or more of the following features:

(a) modified drive of the MOSFET 12, as described above with reference to FIG. 2;

(b) replacement of the diode 14 by a MOSFET 20, as described above with reference to FIG. 4; and (c) together with (b), a resonant circuit coupled to the junction between the source of the MOSFET 12 and the primary winding of the transformer, i.e. to the point HB.

It is emphasized that although all of these features can be used advantageously in combination, either of features (a) and (b) may be used alone, and feature (b) may be used either with or without feature (c). These features may also be applied to any other half-bridge primary switching arrangement.

Whether or not features (b) and (c) are also provided, feature (a) provides the significant advantage that the primary switching arrangement producing the signal HB can be used commonly for a plurality of converter output circuits, and/or with a resonant mode converter circuit, as described above, with independent regulation of the respective outputs.

Although in the converters described above the transformers provide isolation between the input and output(s), it can be appreciated that this need not be the case, and the outputs need not be isolated from the input.

Although as described above the MOSFET 12 and, when it is present, the MOSFET 20 are driven by substantially square waveforms with a 50% duty ratio (except for dead times to avoid simultaneous conduction and for soft switching), this need not be the case and either or both of them can instead be driven with a waveform having a duty ratio either less than or greater than 50%, but any change from 50% correspondingly decreases the duty ratio of the primary switches such as the MOSFET 11. Furthermore, equal waveforms for the MOSFET switches 12 and 20 are required for driving the LLC converter as described above with reference to FIG. 7.

The diode 13 can alternatively be replaced by a controlled switch with an appropriate drive circuit.

These and numerous other modifications, variations, and adaptations which may occur to those of ordinary skill in the art may be made without departing from the scope of the invention as defined in the claims.

The invention claimed is:

1. A DC converter comprising:
   a first switch and a first diode coupled between first and second input terminals for supply of an input voltage, the first switch being coupled between the first input terminal and a first junction, the first diode being coupled between the first junction and the second input terminal;

a signal source coupled to supply a control signal to the first switch for switching the first switch on and off with a substantially constant duty ratio in successive switching cycles;

an LLC converter circuit coupled to the first junction for providing an LLC output, and an LLC control circuit responsive to the LLC output for controlling a variable frequency oscillator for determining a switching cycle frequency of the control signal to regulate the LLC output; and a plurality of flyback or forward DC converter circuits, each comprising:

a respective second switch and a respective second diode coupled between the first and second input terminals, the second diode being coupled between the first input terminal and a second junction, the second switch being coupled between the second junction and the second input terminal;

a respective transformer having a primary winding coupled between the first junction and the second junction, the arrangement being such that the primary winding is coupled to the first input terminal through the first switch and to the second input terminal through the second switch;

a respective rectifier circuit connected to a secondary winding of the transformer for producing a respective DC output; and a respective control unit responsive to the DC output for controlling the second switch with a respective variable duty ratio to regulate the DC output and provide a respective independently regulated DC output, the second switch being switched in each switching cycle to be on during a least a portion of the switching cycle in which the first switch is on and then switched off in each switching cycle while the first switch is on.

2. A DC converter as claimed in claim 1 wherein the constant duty ratio is substantially 50% and each respective variable duty ratio is up to 50%.

3. A DC converter as claimed in claim 2 and including a third switch connected in parallel with the first diode, the third switch being controlled in a complementary manner to the first switch.

4. A DC converter as claimed in claim 3 and including an inductor and a capacitor coupled between the first junction and one of the input terminals, the inductor being coupled between the first junction and the capacitor, the capacitor being coupled between the inductor and the one of the input terminals.

5. A DC converter as claimed in claim 3, the plurality of converter circuits comprising a converter circuit including a capacitor connected in parallel with and augmenting parasitic capacitance of the second switch of the converter circuit.

6. A DC converter comprising:
a half bridge supply circuit comprising:
a first switch coupled between a first input terminal and an output point of the half bridge supply circuit, and a second switch coupled between a second input terminal and said output point, the first and second switches being controlled in a complementary manner with substantially 50% duty ratio to switch said output point alternately between input voltages supplied to the first and second input terminals;

a plurality of flyback or forward converter circuits, each flyback or forward converter circuit comprising:
a primary winding of a respective transformer coupled via a respective third switch between the output point of the half bridge supply circuit and one of the input terminals, a secondary winding of the transformer and at least a rectifier and output capacitor providing a respective flyback or forward converter DC output, and a respective PWM control arrangement responsive to the DC output for controlling switching of the third switch of the converter circuit with a duty ratio less than 50% thereby to regulate the DC output, the PWM control arrangement being arranged to turn on the third switch of the converter circuit with turn on of one of the first and second switches of the half bridge supply circuit for current flow through the primary winding, and to turn off the third switch of the converter circuit before turn off of said one of the first and second switches of the half bridge supply circuit; and a resonant mode converter,
the resonant mode converter coupled to the output point of the half bridge supply circuit for providing a resonant mode converter output, and a resonant mode converter control circuit responsive to the resonant mode converter output for controlling a switching frequency of the first and second switches of the half bridge supply circuit to regulate the resonant mode converter output.

7. A DC converter as claimed in claim 6, the plurality of flyback or forward converter circuits comprising a converter circuit including a capacitor connected in parallel with and augmenting parasitic capacitance of the third switch of the converter circuit.

8. A DC converter as claimed in claim 6 wherein the plurality of flyback or forward converter circuits comprises a flyback or forward converter circuit that includes a diode or a further switch coupled between a junction of the primary winding with the third switch of the converter circuit and another of the input terminals for limiting voltage stress on the third switch of the converter circuit.

9. A DC converter as claimed in claim 6 wherein the resonant mode converter comprises an LLC converter.

10. A DC converter as claimed in claim 6 and including an inductor and a capacitor coupled between the output point of the half bridge supply circuit and one of the input terminals, the inductor being coupled between the output point of the half bridge supply circuit and the capacitor, the capacitor being coupled between the inductor and the one of the input terminals.

11. A DC converter comprising:
a first switch and a first diode coupled between first and second input terminals for supply of an input voltage, the first switch being coupled between the first input terminal and a first junction, the first diode being coupled between the first junction and the second input terminal;

a signal source coupled to supply a control signal to the first switch for switching the first switch on and off with a substantially constant duty ratio in successive switching cycles;

an LLC converter circuit directly electrically connected to the first junction for providing an LLC output, and an LLC control circuit responsive to the LLC output for controlling a variable frequency oscillator for determining a switching cycle frequency of the control signal to regulate the LLC output; and a plurality of flyback or forward DC converter circuits, each comprising:

a respective second switch and a respective second diode coupled between the first and second input terminals, the second diode being coupled between the first input terminal and a second junction, the second switch being coupled between the second junction and the second input terminal;

a respective transformer having a primary winding coupled between the first junction and the second junction, the primary winding being directly electrically connected to the first junction, the arrangement being such that the primary winding is coupled to the first input terminal through the first switch and to the second input terminal through the second switch;

a respective rectifier circuit connected to a secondary winding of the transformer for producing a respective DC output; and a respective control unit responsive to the DC output for controlling the second switch with a respective variable duty ratio to regulate the DC output and provide a respective independently regulated DC output, the second switch being switched in each switching cycle to be on during a least a portion of the switching cycle in which the first switch is on and then switched off in each switching cycle while the first switch is on.

12. A DC converter as claimed in claim 11 wherein the constant duty ratio is substantially 50% and each respective variable duty ratio is up to 50%.

13. A DC converter as claimed in claim 12 and including a third switch connected in parallel with the first diode, the third switch being controlled in a complementary manner to the first switch.

14. A DC converter as claimed in claim 13 and including an inductor and a capacitor coupled between the first junction and one of the input terminals, the inductor being coupled between the first junction and the capacitor, the capacitor being coupled between the inductor and the one of the input terminals.

15. A DC converter as claimed in claim 13, the plurality of converter circuits comprising a converter circuit including a capacitor connected in parallel with and augmenting parasitic capacitance of the second switch of the converter circuit.

* * * * *